United States Patent

Han

(10) Patent No.: US 7,495,711 B2
(45) Date of Patent: Feb. 24, 2009

(54) APPARATUS AND METHOD OF SETTING SOUND MODE

(75) Inventor: Dong-hoon Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 669 days.

(21) Appl. No.: 10/844,494

(22) Filed: May 13, 2004

(65) Prior Publication Data

US 2004/0233338 A1 Nov. 25, 2004

(30) Foreign Application Priority Data

May 24, 2003 (KR) .................. 10-2003-0033245

(51) Int. Cl.
*H04N 5/60* (2006.01)
(52) U.S. Cl. .................. 348/738; 348/462
(58) Field of Classification Search .......... 348/738, 348/725, 462, 478, 482, 484, 553; *H04N 7/08, H04N 7/087, 5/44, 5/60*
See application file for complete search history.

(56) References Cited

U.S. PATENT DOCUMENTS

| | | | | |
|---|---|---|---|---|
| 5,339,110 | A * | 8/1994 | Hara et al. | 348/738 |
| 5,570,134 | A * | 10/1996 | Hong | 348/462 |
| 5,684,878 | A | 11/1997 | Nagura | |
| 6,188,439 | B1 * | 2/2001 | Kim | 348/478 |
| 6,980,257 | B2 * | 12/2005 | Fairhurst et al. | 348/589 |

FOREIGN PATENT DOCUMENTS

| | | |
|---|---|---|
| JP | 07-240905 | 9/1995 |
| JP | 09-154113 | 6/1997 |
| JP | 10-257456 | 9/1998 |
| JP | 10-336612 | 12/1998 |
| JP | 2000-125221 | 4/2000 |
| KR | 2000-36691 | 7/2000 |
| KR | 2000-54230 | 9/2000 |
| WO | WO 02/096097 | 11/2002 |

OTHER PUBLICATIONS

-The Official Action issued by the Korean Intellectual Property Office on Apr. 21, 2005 and listing 1 reference.

* cited by examiner

*Primary Examiner*—Sherrie Hsia
(74) *Attorney, Agent, or Firm*—Stanzione & Kim, LLP

(57) ABSTRACT

An apparatus and a method of automatically setting a sound mode of a broadcast receiver without a user setting, using a vertical blanking interval. The apparatus includes a vertical blanking interval signal decoder, a memory, a sound decoder, and a system control unit. The vertical blanking interval signal decoder decodes a signal included in the vertical blanking interval of a received broadcasting signal. The memory stores one or more sound band control signals with respect to a plurality of sound modes. The sound decoder controls a sound band of an audio signal included in the received broadcasting signal and outputs the audio signal whose sound band is controlled. The system control unit detects a sound band control signal from the memory based on sound mode data included in data output from the vertical blanking interval signal decoder and controls the sound decoder using the detected sound band control signal.

29 Claims, 2 Drawing Sheets

APPARATUS AND METHOD OF SETTING SOUND MODE

CROSS-REFERENCE TO RELATED APPLICATIONS

This application claims the priority of Korean Patent Application No. 2003-33245, filed on 24 May 2003 in the Korean Intellectual Property Office, the disclosure of which is incorporated herein in its entirety by reference.

BACKGROUND OF THE INVENTION

1. Field of the Invention

The present general inventive concept relates to an apparatus for and a method of setting a sound mode of a broadcast receiver, and more particularly, to an apparatus for and a method of automatically setting a sound mode for each of a plurality of broadcast programs.

2. Description of the Related Art

A sound mode of a conventional broadcast receiver is configured to be set by a user. Thus, in order to optimize a sound effect of the broadcast receiver, the user must manually set the sound mode of the broadcast receiver while the broadcast receiver receives a broadcast program.

For example, if the user sets the sound mode of the broadcast receiver according to a genre of the broadcast program, the user must determine the genre of the received broadcast program and set the sound mode accordingly.

SUMMARY OF THE INVENTION

In order to solve the foregoing and/or other problems, it is an aspect of the present general inventive concept to provide an apparatus for and a method of automatically setting a sound mode of a broadcast receiver for each broadcast program without a user selection.

It is another aspect of the present general inventive concept to provide an apparatus for and a method of automatically setting a sound mode of a broadcast receiver using a vertical blanking interval (VBI).

Additional aspects and advantages of the present general inventive concept will be set forth in part in the description which follows and, in part, will be obvious from the description, or may be learned by practice of the general inventive concept.

The foregoing and/or other aspects of the present general inventive concept may be achieved by providing an apparatus to set a sound mode of a broadcast receiver, the apparatus including a vertical blanking interval signal decoder to decode a signal included in a vertical blanking interval of a received broadcasting signal, and a system control unit to automatically control the sound mode of the broadcast receiver based on sound mode data included in data output from the vertical blanking interval signal decoder.

The foregoing and/or other aspects of the present general inventive concept may also be achieved by providing an apparatus to set a sound mode of a broadcast receiver, the apparatus including a vertical blanking interval signal decoder to decode a signal included in a vertical blanking interval of a received broadcasting signal, a memory to store a sound band control signal with respect to a plurality of sound modes, a sound decoder to control a sound band of an audio signal included in the received broadcasting signal and to output the audio signal whose sound band is controlled, and a system control unit to detect a sound band control signal from the memory based on sound mode data included in data output from the vertical blanking interval signal decoder and to control the sound decoder using the detected sound band control signal.

The foregoing and/or other aspect of the present general inventive concept may also be achieved by providing a method of setting a sound mode of a broadcast receiver, the method including decoding a signal included in a vertical blanking interval of a received broadcasting signal, and controlling the sound mode of the broadcast receiver based on sound mode data included in the decoded signal.

The foregoing and/or other aspects of the present general inventive concept may also be achieved by providing a method of setting a sound mode of a broadcast receiver the method including decoding a signal included in a vertical blanking interval of a received broadcasting signal, detecting sound mode data of the received broadcasting signal from the decoded signal, detecting a sound band control signal from a plurality of preset sound band control signals based on the detected sound mode data, and controlling the sound mode of the broadcast receiver using the detected sound band control signal.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
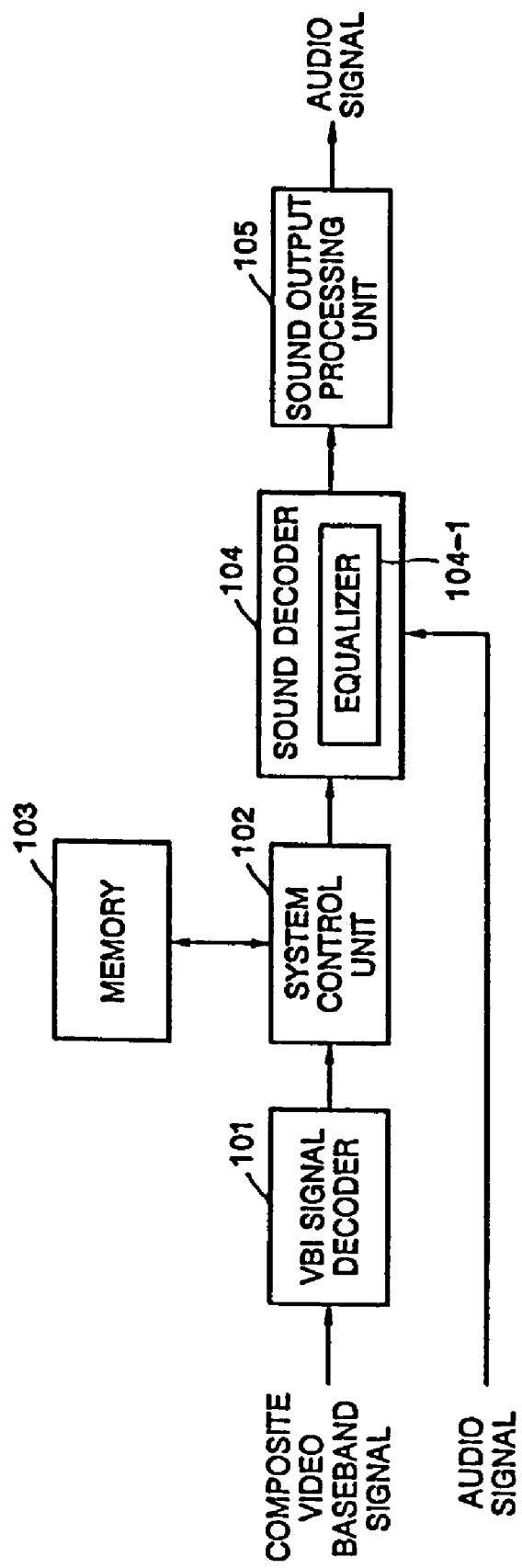
FIG. 1 is a functional block diagram describing a broadcast receiver including an apparatus to set a sound mode according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

FIG. 1 is a functional block diagram describing a broadcast receiver including an apparatus to set a sound mode according to an embodiment of the present invention. Referring to FIG. 1, the broadcast receiver may include a vertical blanking interval (hereinafter, referred to as a VBI) signal decoder 101, a system control unit 102, a memory 103, a sound decoder 104, and a sound output processing unit 105.

The VBI signal decoder 101 can detect a signal included in a VBI signal (hereinafter, referred to as a VBI signal) of a composite video baseband signal (hereinafter, referred to as a CVBS) and decodes the detected signal. The CVBS can be a broadcasting signal having the VBI signal and received from a broadcasting station (not shown). The decoded VBI signal can be output to the system control unit 102.

Once receiving the decoded VBI signal, the system control unit 102 can detect sound mode data included in the received VBI signal. The sound mode data represents sound characteristics of the broadcast receiver with respect to a currently received broadcast program.

Thus, a type of the sound mode data included in the VBI can be determined based on a genre of a broadcast program that can be provided by the broadcasting station, and sound characteristics that can be set by the broadcast receiver.

In other words, if the sound characteristics of the broadcast receiver can be set according to the genre of the broadcast program, the sound mode data can have a value used in determining the genre of the broadcast program. For example, if the sound characteristics of the broadcast receiver can be set for each genre of broadcast programs, i.e., a movie, a drama, sports, documentary, news, and reportage, the sound mode data can have the value used in determining whether the broadcast program is a movie, a drama, sports, documentary, news, or reportage.

Also, if the sound characteristics of the broadcast receiver can be set variously irrespective of the genre of the broadcast program, the number of the sound mode data provided by the broadcasting station can be determined based on the number of the sound characteristics that can be set by the broadcast receiver. That is, the number of the sound mode data provided by the broadcasting station can be equal to the number of the sound characteristics that can be set by the broadcast receiver. For example, if the number of the sound mode data provided by the broadcasting station is equal to 16, the number of the sound characteristics set by the broadcast receiver can be equal to 16, and the sound mode data can be expressed by 4 bits. In this case, a specification for the sound mode data can be determined by an agreement between broadcasting stations and a manufacturer of the broadcast receiver.

The system control unit 102 can detect a sound band control signal from the memory 103 based on the detected sound mode data.

A plurality of sound band control signals can be stored in the memory 103. The number of the sound band control signals can be equal to the number of the sound mode data. The sound band control signals can be used in controlling a sound band of an audio signal. In other words, the sound band control signals can be used in controlling a base level and/or a treble level of the audio signal.

After detecting the sound band control signal from the memory 103, the system control unit 102 can provide the detected sound band control signal to the sound decoder 104.

The system control unit 102 can detect the sound band control signal for each broadcast program. However, if a plurality of sound mode data are transmitted from a broadcasting station for a same broadcast program, that is, if the sound mode data is changed from first sound mode data to second sound mode data in the same broadcast program, the system control unit 102 can detect a sound band control signal corresponding to the changed sound mode data, i.e., the second sound mode data, to control the sound decoder 104. Thus, if the plurality of sound mode data are transmitted from a broadcasting station for the same broadcast program, the broadcast receiver can change a sound mode for the same broadcast program whenever the sound mode data changes.

The sound decoder 104 can control the sound band of the audio signal incorporated into the received broadcasting signal, using the sound band control signal and can output the audio signal whose sound band is controlled. To control the sound band of the audio signal, the sound decoder 104 may include an equalizer 104-1. The equalizer 104-1 can be controlled according to the sound band control signal. Thus, the sound decoder 104 can adjust a frequency signal band of an input audio signal by controlling the equalizer 104-1 using the sound band control signal to output the audio signal whose sound band is controlled.

The sound output processing unit 105 can convert the audio signal having the controlled sound band into a format that can be output. To this end, the sound output processing unit 105 can include an amplifier (not shown) and a speaker (not shown) to amplify the frequency of the audio signal output from the sound decoder 104 to a predetermined level and to output the audio signal so that the user can listen to sound corresponding to the output audio signal.

Figure 2:
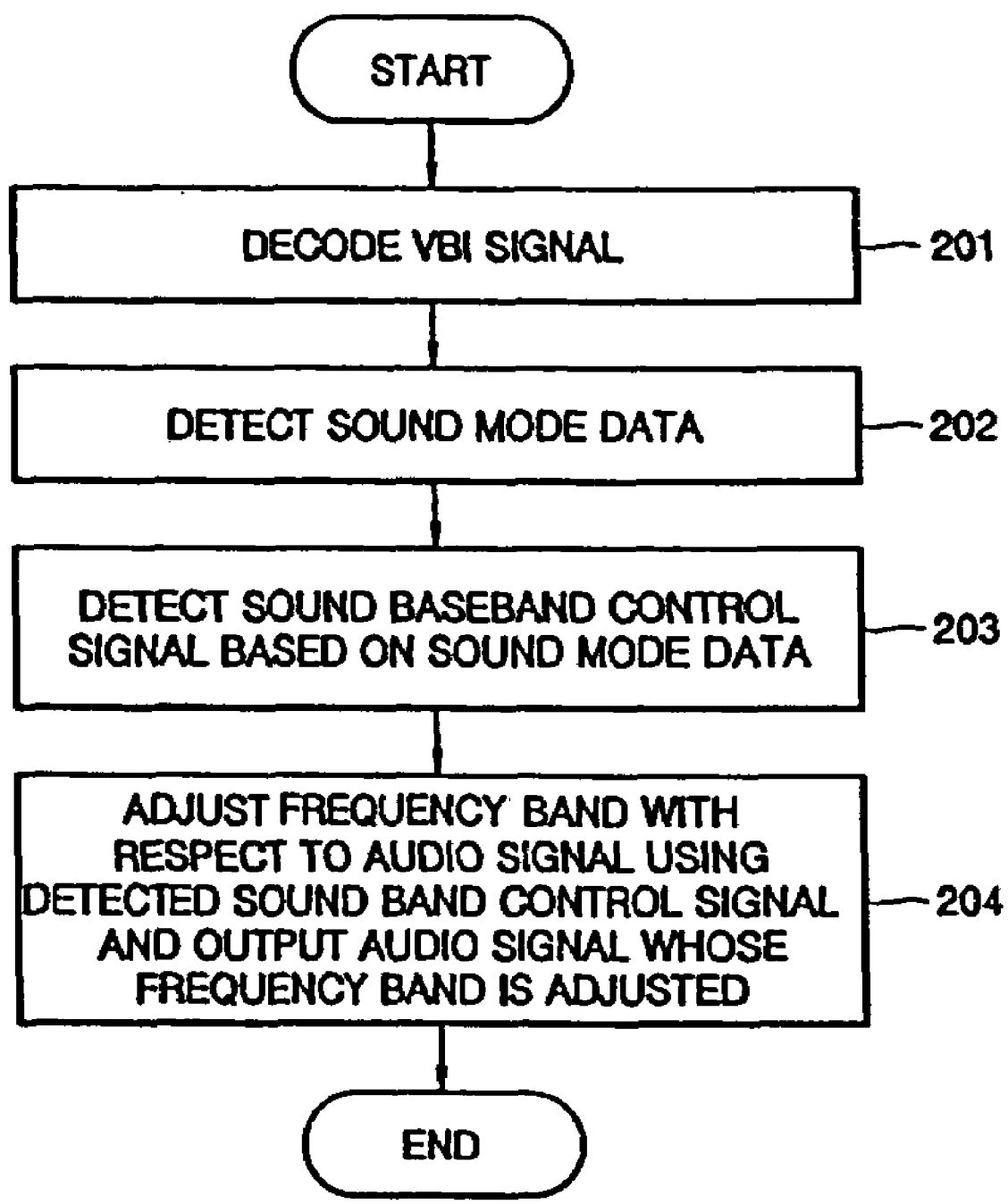
FIG. 2 is a flowchart describing a method of setting a sound mode according to another embodiment of the present general inventive concept.

FIG. 2 is a flowchart describing a method of setting a sound mode in a broadcast receiver according to another embodiment of the present general inventive concept.

Referring to FIGS. 1 and 2, when the broadcast receiver receives a broadcasting signal constructed as the CVBS, the VBI signal of the received broadcasting signal can be decoded (operation 201). The sound mode data can be detected from the decoded VBI signal (operation 202).

The sound band control signal can be detected based on the detected sound mode data (operation 203). The number of sound band control signals is preset in a broadcast receiver to be the same as the number of the sound mode data that can be generated. In other words, if the number of the sound mode data that can be provided from a broadcasting station using the VBI is 16, 16 sound band control signals are preset in the broadcast receiver. The number of sound mode data and the number of the sound band control signals can be determined according to the genre of a broadcast program that can be provided by the broadcasting station and the sound characteristics that can be set by the broadcast receiver.

Thus, the sound band control signal corresponding to the detected sound mode data is detected from among a plurality of sound band control signals (operation 203). The sound band control signal can control the base level and/or the treble level of an audio signal included in the broadcasting signal.

A frequency band with respect to the audio signal included in the received broadcasting signal can be adjusted using the detected sound band control signal, and the audio signal of the adjusted frequency band can be output to the user (operation 204).

As described above, the sound mode of the broadcast receiver can be automatically controlled based on the sound mode data included in the VBI of the broadcasting signal. The controlling of the sound mode can be performed for each broadcast program. However, if a broadcasting station transmits a plurality of sound mode data with respect to one broadcast program, the sound mode of the broadcast receiver can change whenever the sound mode data changes. In addition, the sound mode of the broadcast receiver can be set according to the genre of a broadcast program. Therefore, it is possible to optimize a sound effect of a broadcast receiver without a user setting.

While the present general inventive concept has been particularly shown and described with reference to an exemplary embodiment thereof, it will be understood by those of ordinary skill in the art that various changes in form and details may be made therein without departing from the spirit and scope of the invention as defined by the appended claims and their equivalents.

What is claimed is:

1. An apparatus to set a sound mode of a broadcast receiver, the apparatus comprising:
   a vertical blanking interval signal decoder to decode a signal included in a vertical blanking interval of a received broadcasting signal to output sound mode data and from the signal; and
   a system control unit to automatically control a sound mode of the broadcast receiver based on the sound mode data output from the vertical blanking interval signal decoder.

2. The apparatus of claim 1, wherein the received broadcasting signal comprises a plurality of broadcast programs each having the sound mode data, and the system control unit controls the sound mode with respect to each broadcast program.

3. The apparatus of claim 1, wherein the sound mode data is set according to sound characteristics of the broadcast receiver corresponding to a genre of a broadcast program.

4. The apparatus of claim 1, wherein the vertical blanking interval signal decoder can output a plurality of sound mode data corresponding to different sound modes included in a currently received broadcasting signal, and wherein the system control unit can change the sound mode of the broadcast receiver when the sound mode data changes.

5. The apparatus of claim 1, wherein the sound mode comprises a mode to control a characteristic of a frequency band of an audio signal of the received broadcasting signal.

6. The apparatus of claim 1, further comprising an equalizer to control a characteristic of a frequency band of an audio signal of the received broadcasting signal according to the sound mode.

7. An apparatus to set a sound mode of a broadcast receiver, the apparatus comprising:
a vertical blanking interval signal decoder to decode a signal included in a vertical blanking interval of a received broadcasting signal to output sound mode data;
a memory to store one or more sound band control signals with respect to one or more sound modes;
a sound decoder to control a sound band of an audio signal included in the received broadcasting signal and to output the audio signal whose sound band is controlled; and
a system control unit to detect a sound band control signal from the memory based on the sound mode data output from the vertical blanking interval signal decoder and to control the sound decoder using the detected sound band control signal,
wherein the sound modes are set according to sound characteristics of the broadcast receiver corresponding to a genre of a broadcast program.

8. The apparatus of claim 7, wherein the sound decoder controls a base level and/or a treble level of the audio signal using the sound band control signal.

9. The apparatus of claim 7, wherein the received broadcasting signal comprises a plurality of broadcast programs each having the sound mode data, and the system control unit controls the sound mode with respect to each of the plurality of broadcast programs.

10. A method of setting a sound mode of a broadcast receiver, the method comprising:
decoding a signal included in a vertical blanking interval of a received broadcasting signal to output sound mode data from the signal; and
controlling a sound mode of the broadcast receiver based on the sound mode data included in the decoded signal.

11. The method of claim 10, wherein the received broadcasting signal comprises a plurality of broadcast programs each having the sound mode data, and the controlling of the sound mode is performed with respect to each broadcast program.

12. The method of claim 10, wherein the sound mode data is set according to sound characteristics of the broadcast receiver according to a genre of a broadcast program.

13. A method of setting a sound mode of a broadcast receiver, the method comprising:
decoding a signal included in a vertical blanking interval of a received broadcasting signal;
detecting sound mode data of the received broadcasting signal from the decoded signal;
detecting a sound band control signal from a plurality of preset sound band control signals based on the detected sound mode data; and
controlling a sound mode of the broadcast receiver using the detected sound band control signal,
wherein the sound moddes are set according to sound characteristics of the broadcast receiver correspondong to a genre of a broadcast program.

14. The method of claim 13, wherein the controlling of the sound mode comprises controlling a frequency band of an audio signal included in the received broadcasting signal using the detected sound band control signal.

15. The method of claim 13, wherein the controlling of the sound mode comprises controlling a base level and/or a treble level of sound corresponding to the audio signal using the detected sound band control signal.

16. An apparatus to set a sound mode of a broadcast receiver, the apparatus comprising:
a blanking interval signal decoder to decode a signal included in a blanking interval of a received broadcasting signal to output sound mode data from the signal; and
a system unit to control a sound mode of the broadcast receiver according to the decoded sound mode data.

17. The apparatus of claim 16, further comprising:
a sound output processing unit to amplify a frequency of an audio signal included in the receiver broadcasting signal and to adjust a base level or a treble level of the audio signal according to the decoded sound mode data.

18. The apparatus of claim 16, further comprising:
a sound decoder to generate an audio signal of the received broadcasting signal according to the controlled sound mode.

19. The apparatus of claim 16, further comprising:
a memory to store one or more sound band control signals,
wherein the system unit detects one of the one or more sound band control signals according to the decoded sound mode data to control the sound mode of the broadcast receiver according to the detected sound band control signal.

20. The apparatus of claim 19, wherein the number of the one or more sound band control signals is the same as the number of the sound mode data included in the received broadcast signal.

21. The apparatus of claim 16, wherein:
the received broadcasting signal comprises a single broadcast program having the signal corresponding to the sound mode data and a second signal corresponding to second sound mode data;
the blanking interval signal decoder decodes the second signal included in a second blanking interval of the received broadcasting signal to output the second sound mode data; and
the system unit changes the sound mode to a second sound mode of the broadcast receiver according to a change from the sound mode data to the second sound mode data.

22. The apparatus of claim 16, wherein the blanking interval signal decoder decodes a second signal included in a blanking interval of another received broadcasting signal to output second sound mode data, and the system unit controls a sound mode of the another broadcast receiver based on the another sound mode data.

23. An apparatus to set a sound mode of a broadcast receiver, the apparatus comprising:

a signal decoder to decode a composite video signal included in a received broadcasting signal to output sound mode data; and a system unit to control a sound mode of the broadcast receiver with respect to an audio signal included in the received broadcasting signal, according to the decoded sound mode data.

24. An apparatus to set a sound mode of a broadcast receiver, the apparatus comprising:

a detector to detect sound mode data from a received broadcasting signal;

a system control unit to control a sound mode of the broadcast receiver based on the detected sound mode data, where the sound mode data is set according to sound characteristics of the broadcast receiver corresponding to a genre of a broadcast program.

25. The apparatus of claim 24, wherein the received broadcasting signal comprises a plurality of broadcast programs each having the sound mode data, and the system control unit controls the sound mode with respect to each broadcast program.

26. An apparatus to set a sound mode of a broadcast receiver, the apparatus comprising:

a detector to detect sound mode data from a received broadcasting signal;

a memory to store one or more sound band control signals with respect to one or more sound modes;

a sound decoder to control a sound band of an audio signal included in the received broadcasting signal and to output the audio signal whose sound band is controlled; and a system control unit to detect a sound band control signal from the memory based on the sound mode data and to control the sound decoder using the detected sound band control signal, wherein the sound modes are set according to sound characteristics of the broadcast receiver corresponding to a genre of a broadcast program.

27. A method of setting a sound mode of a broadcast receiver, the method comprising:

detecting sound mode data from a received broadcasting signal;

controlling a sound mode of the broadcast receiver based on the sound mode data, where the sound mode data is set according to sound characteristics of the broadcast receiver corresponding to a genre of a broadcast program.

28. The method of claim 27, wherein the received broadcasting signal comprises a plurality of broadcast programs each having the sound mode data, and the controlling of the sound mode is performed with respect to each broadcast program.

29. A method of setting a sound mode of a broadcast receiver, the method comprising:

detecting sound mode data from a received broadcasting signal;

detecting a sound band control signal from a plurality of preset sound band control signals based on the detected sound mode data; and controlling a sound mode of the broadcast receiver using the detected sound band control signal, wherein the sound mode is set according to sound characteristics of the broadcast receiver corresponding to a genre of a broadcast program.

* * * * *